United States Patent [19]
Draves

[11] Patent Number: 5,410,244
[45] Date of Patent: Apr. 25, 1995

[54] AIR CORE GAUGE TESTING METHOD AND APPARATUS UTILIZING MAGNETIC COUPLING BETWEEN GAUGE COILS

[75] Inventor: Kenneth G. Draves, Russiaville, Ind.

[73] Assignee: Delco Electronics Corporation, Kokomo, Ind.

[21] Appl. No.: 58,086

[22] Filed: May 10, 1993

[51] Int. Cl.$^6$ .............................. G06F 9/00; G01R 5/16
[52] U.S. Cl. ................. 324/74; 324/140 R; 364/571.01
[58] Field of Search ............... 324/158 MG, 144, 146, 324/132, 143, 154 R, 160, 167, 140 R, 772; 364/550.1, 424.01, 571.01

[56] References Cited

U.S. PATENT DOCUMENTS

| | | | |
|---|---|---|---|
| 3,113,300 | 12/1963 | Sullivan | 340/347 |
| 3,253,218 | 5/1966 | Mayer | 324/70 |
| 3,562,740 | 2/1967 | Watkins | 340/347 |
| 3,602,811 | 8/1971 | Fales | 324/132 |
| 3,636,447 | 1/1972 | Gelenius | 324/140 R |
| 4,864,242 | 9/1989 | Hurley | 324/158 MG |
| 4,939,675 | 7/1990 | Luitje | 324/166 |
| 4,991,098 | 2/1991 | Dantzler | 324/140 R |
| 5,004,976 | 4/1991 | Markow et al. | 324/146 |
| 5,187,434 | 2/1993 | Ando | 324/158 MG |
| 5,296,804 | 3/1994 | Markow et al. | 324/140 R |
| 5,359,284 | 10/1994 | Hawes et al. | 324/144 |

FOREIGN PATENT DOCUMENTS

0141670 5/1990 Japan .................. 324/146

*Primary Examiner*—Vinh Nguyen
*Attorney, Agent, or Firm*—Anthony L. Simon; Jimmy L. Funke

[57] ABSTRACT

A method for testing gauges includes applying a rotation signal to the gauge. An AC input signal is superimposed on a first coil of the gauge. A second coil of the gauge is monitored to detect a coupled AC output signal. The rotational signal is varied while the AC output signal is monitored. The operational status of the gauge is determined responsive to the AC output signal and a process output signal indicative of the operational status is provided.

11 Claims, 10 Drawing Sheets

AIR CORE GAUGE TESTING METHOD AND APPARATUS UTILIZING MAGNETIC COUPLING BETWEEN GAUGE COILS

The subject of this Application is related to the subject of copending U.S. patent application Ser. No. 08/058,332, filed concurrently with this Application, assigned to the assignee of this Application and the disclosure of which is incorporated herein by reference.

This invention pertains to air core gauges and more particularly to an apparatus and method for testing air core gauges and the like.

BACKGROUND OF THE INVENTION

In the manufacture of air core gauges, it is highly desirable to test the air core gauges for proper operation before they are assembled into an instrumentation unit or other such unit. Typically, testing the air core gauges requires having an operator insert a pointer on the gauge spindle and energizing the gauge to ensure that it operates through the proper range of motion. This testing procedure is expensive, requiring the labor of an operator, the use of pointers, and the risk of damaging the gauge spindle while attaching the pointers. Even automated means of checking the gauges, such as using a camera and a computer, are expensive.

If the gauges are not checked before installation into a unit, such as an instrumentation cluster, faulty gauges can require completed assemblies to be reworked, which involves disassembling the unit, changing the gauge and reassembling the unit. This is also a costly approach to manufacturing.

What is desired is a more cost effective way of testing air core gauges.

SUMMARY OF THE PRESENT INVENTION

The present invention provides a method and apparatus for the testing of air core gauges that does not require an operator to place a pointer on the gauge. The testing method and apparatus of this invention can be completely automated without requiring camera's or computer vision. Additionally, this invention does not require the gauge to be assembled into an instrumentation unit to determine if it functions properly.

The present invention uses a newly discovered principal which is counter-intuitive to knowledge conventionally applied by those skilled in the air core gauge art. Instead of treating the magnetic rotor of the air core gauge as an air gap as is conventionally done by those skilled in the art, the magnetic rotor is used in a novel approach for electronically determining the rotational position of the spindle using a magnetic coupling phenomenon of the magnetic rotor.

In the typical air core gauge, the two coils are mounted substantially perpendicular to each other and have very little magnetic coupling. However, the magnetic spindle of the air core gauge "links" the two coils, encouraging magnetic coupling in a manner dependent upon the relative position of the poles of the magnetic spindle.

Utilizing the magnetic coupling phenomenon of the magnetic rotor, the method and apparatus of this invention can be implemented to obtain benefits including, but not limited to, an electronic test for: (i) proper dampening in the gauge, (ii) whether the coils of the gauge are wound properly, (iii) whether one of the coils is broken, (iv) whether the magnetic spindle is charged properly, and (v) if there is foreign material inside the gauge that would cause the gauge to stick or move erratically.

More particularly, the apparatus of this invention comprises controllable drive means for applying a variable rotation signal to at least first and second coils of a gauge and a means for applying an input AC signal to the first coil of the gauge, superimposing the input AC signal over the rotation signal in the first coil. A process means (i) receives a coupled AC signal from the second coil, (ii) controls the drive means to affect a variation in the rotation signal, and (iii) provides an output signal, responsive to the coupled AC signal, indicative of the operational status of the gauge.

The method of testing gauges according to this invention comprises the steps of applying a rotation signal to the gauge, applying an AC input signal to a first coil of the gauge, monitoring a second coil of the gauge to detect a coupled AC output signal, varying the rotation signal applied to the gauge, determining the operational status of the gauge responsive to the coupled AC output signal, and providing an output signal indicative of the operational status of the gauge.

DETAILED DESCRIPTION OF THE INVENTION

Figure 1:
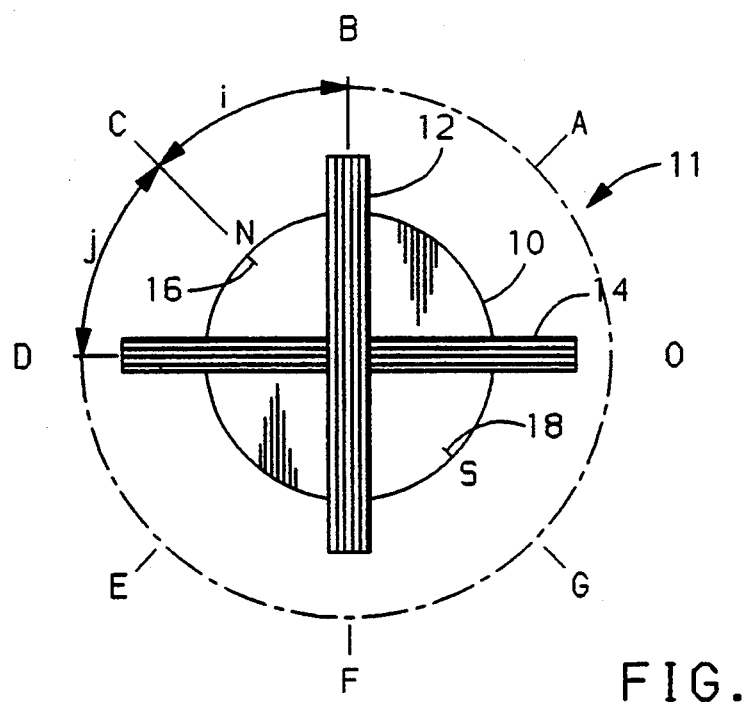
FIG. 1 is a schematic diagram of a typical air core gauge and the operating principals of this invention.
Figure 2:
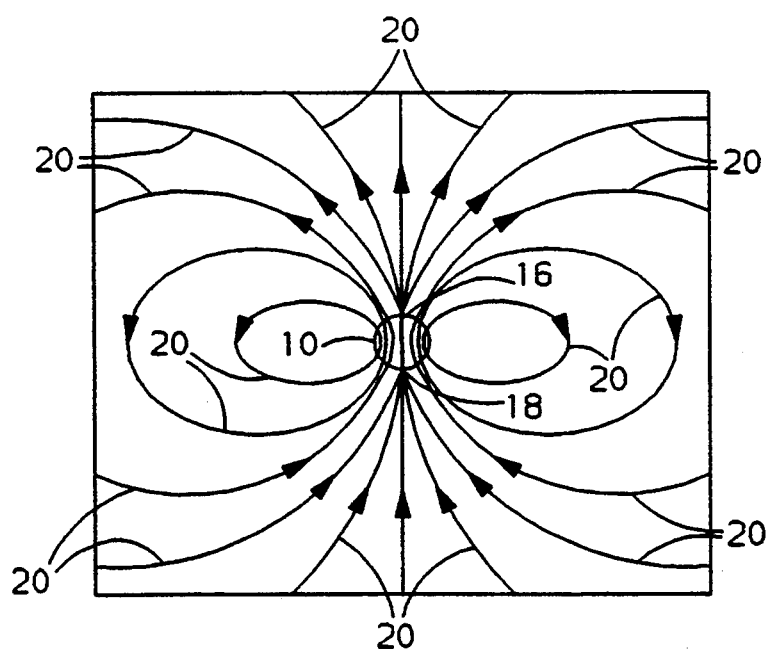
FIG. 2 is an illustration of the magnetic flux patterns of a disk magnet.

FIG. 1 shows a schematic illustration of air core gauge 11, containing coils 12 and 14, which represent two windings of wire typically found in an air core gauge. The two windings are typically wound around perpendicular axes, as shown with coil 12 wound around the O-D axis and coil 14 wound around the B-F axis. The magnetic rotor 10 of the gauge is typically a disk shaped magnet having North and South poles 16 and 18 as shown. The flux characteristics of a two pole magnetic disk magnet, such as rotor 10, are shown as flux lines 20 in FIG. 2.

With reference to FIG. 1, when rotor 10 is rotated so that the North pole 16 corresponds to position 0, the rotor is at the zero degrees of rotation for purposes of the description below. Likewise, when rotor 10 is rotated so that North pole 16 corresponds to positions A, B, C, D, E, F and G, the rotor 10 is at the 45, 90, 135, 180, 225, 270 and 315 degree positions, respectively.

In accordance with the principals upon which this invention operates, coils 12 and 14 of the gauge 11 may be charged with a normal rotation drive signal to affect an angular rotation of the rotor 10. Coil 12 is additionally coupled to an AC signal source so that an AC input signal is superimposed onto the portion of the drive signal in coil 12. If coils 12 and 14 are perfectly perpendicular, there is no magnetic coupling of the AC input signal from coil 12 to 14. However, rotor 10 has a magnetic flux linkage to each coil, and hence provides a magnetic flux linkage between coils 12 and 14, inducing a coupled AC output signal (referred to below as the "AC output signal") on coil 14 in response to the AC input signal on coil 12. Since the rotation drive signal is substantially DC, the rotation drive signal does not cause signal coupling between coils 12 and 14.

The flux linkage between coil 12 and rotor 10 is proportional to sin(i), where i is the angle between North pole 16 (or South pole 18) and a line drawn through points B and F. The flux linkage between coil 14 and rotor 10 is proportional to sin(j), where j is the angle between North pole 16 (or South pole 18) and a line drawn through points D and O. Since magnetic fluxes are vectors and are additive, rotor 10 links the two coils with a flux linkage proportional to sin(i)sin(j).

Figure 3:
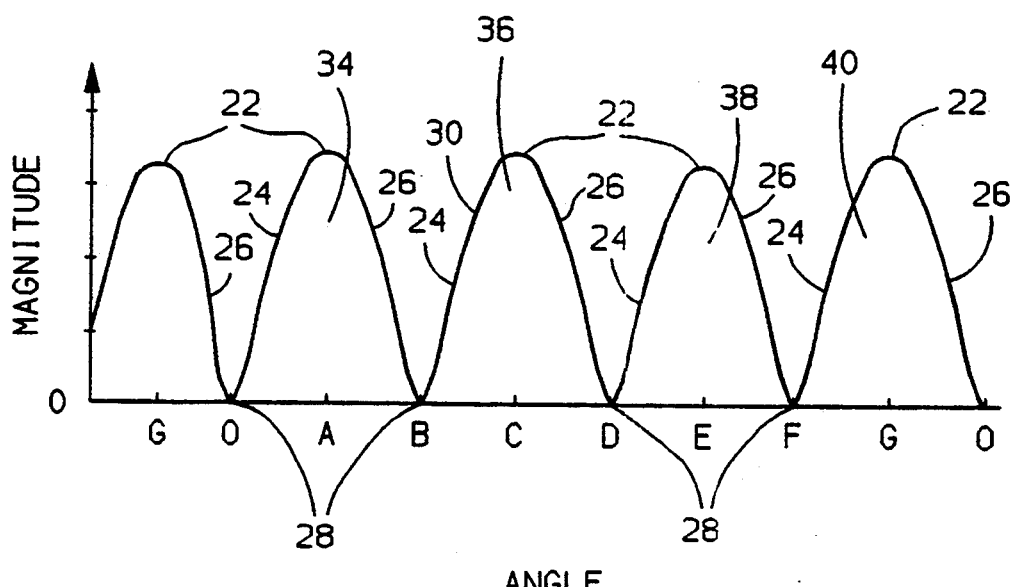
FIG. 3 is an illustration of the magnitude of a coupled AC output signal in an ideal gauge.

With the flux linkage between coils 12 and 14 dependent upon the rotational position of rotor 10, the magnitude of the AC output signal in coil 14 is also dependent upon the rotational position of rotor 10. FIG. 3 illustrates, relative to the angle of rotation of rotor 10, the magnitude of the AC output signal in coil 14 for an ideal gauge with perfectly perpendicular coils and a perfectly symmetrical magnetic rotor.

In FIG. 3, curve 30 represents the magnitude of the AC output signal verses the angle of rotation. As North pole 16 is rotated between points O, A, B, C, D, E, F and G, the magnitude 30 has four minimums 28, four maximums 22, four periods of positive slope 24 and four periods of negative slope 26. Through the rotation, curve 30 has four equal lobes, 34, 36, 38 and 40. The minimums 28, where the coupled AC output signal is virtually zero, occur at points O, B, D and F, which are 90 degrees apart and correspond to the position of the North and South poles 16 and 18 when they are parallel to either of the axes of coils 12 or 14. The maximums 22 of the magnitude in the AC output signal occur at points A, C, E, and G and are 90 degrees apart, and ideally 45 degrees from each adjacent minimum 28.

Figure 4:
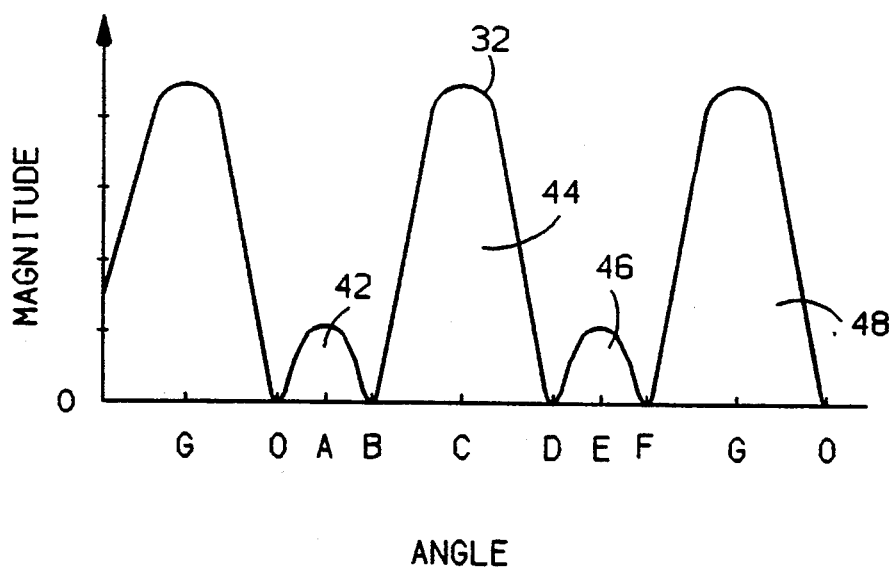
FIG. 4 is an illustration of the magnitude of a coupled AC output signal in either a non-ideal gauge or a gauge in a phase-shifting circuit.

FIG. 4 represents a magnitude curve 32 of the AC output signal in a non-ideal gauge. If, for example, coils 12 and 14 are not exactly perpendicular, the four lobes 42, 44, 46 and 48 of the curve will not be equal. The four minimums may be shifted so that they are not exactly 45 degrees from the adjacent maximums. Additionally if the magnetic rotor is not exactly symmetrical, as in one pole having a higher flux density than the other pole, then the four lobes of the curve 32 will be unequal and the minimums may be shifted as shown. Although the lobes are unequal and the minimums are shifted, lobes 42 and 46 are equal to each other in height and width and lobes 44 and 48 are equal to each other in height and width.

Another factor that can affect the characteristics of the AC output signal is the circuitry connected to the gauge coils. If the circuitry implemented causes a phase shift in the AC signal the minimums may be shifted and the lobes may become uneven as shown in FIG. 4.

Figure 5:
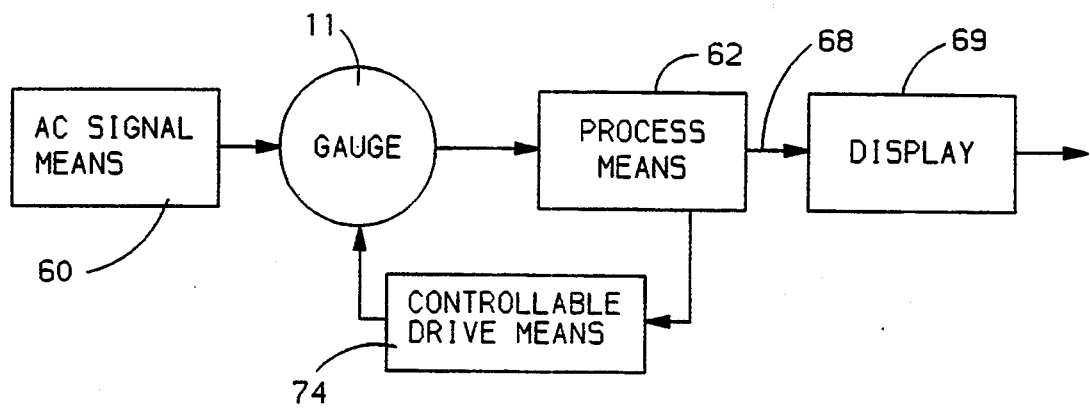
FIG. 5 is block diagram of the apparatus of this invention.

Referring to FIG. 5, the apparatus of this invention applying the above described phenomenon is shown including AC signal means 60, controllable drive means 74 and process means 62. The AC signal means 60 applies an AC input signal, preferably a sine wave, to the first coil (coil 12, FIG. 1) of gauge 11. Controllable drive means 74 applies a variable rotation signal to at least the first and second coils (coils 12 and 14, FIG. 1) of gauge 11. The rotation signal is substantially DC, and varies with the desired rotation of the gauge rotor.

The rotation signal and gauge may be any type known in gauge technology. For example, if the gauge 11 is a two coil air core gauge, it may be driven by a sin/cos driver. In another example, gauge 11 may be a three coil air core gauge, conventionally driven in a manner well known by those skilled in the art. If a three coil air core gauge is used, the AC input signal is coupled to a first of the coils, preferably a coil that has one terminal coupled to ground, and the coupled AC output signal is received from a second coil mounted perpendicular to the first coil.

Another gauge implementation for this invention is in a gauge in which the two coils (12 and 14) are not substantially perpendicular. In such implementations, the lobes (FIGS. 3 and 4) are not even and the resolution of the coupled AC output signal is not as great.

The AC input signal and the portion of the rotation signal in the first coil are superimposed, so that the first coil carries a substantially DC signal with an AC component.

Process means 62 comprises a means for receiving the AC output signal from the second coil (coil 14, FIG. 1) and a means for controlling the drive means 74 to affect a variation in the rotation signal. In response to the AC output signal received by the signal receiving means, process means 62 determines if the gauge 11 is responding properly to the rotation signal provided by drive means 74. By determining whether gauge 11 is responding properly to the rotation signal, the process means is determining the operational status of the gauge, i.e., whether or not the gauge is defective. The process means 62 comprises means for providing an output signal to display 69 on line 68 indicative of the operational status of the gauge 11.

Figure 6A:
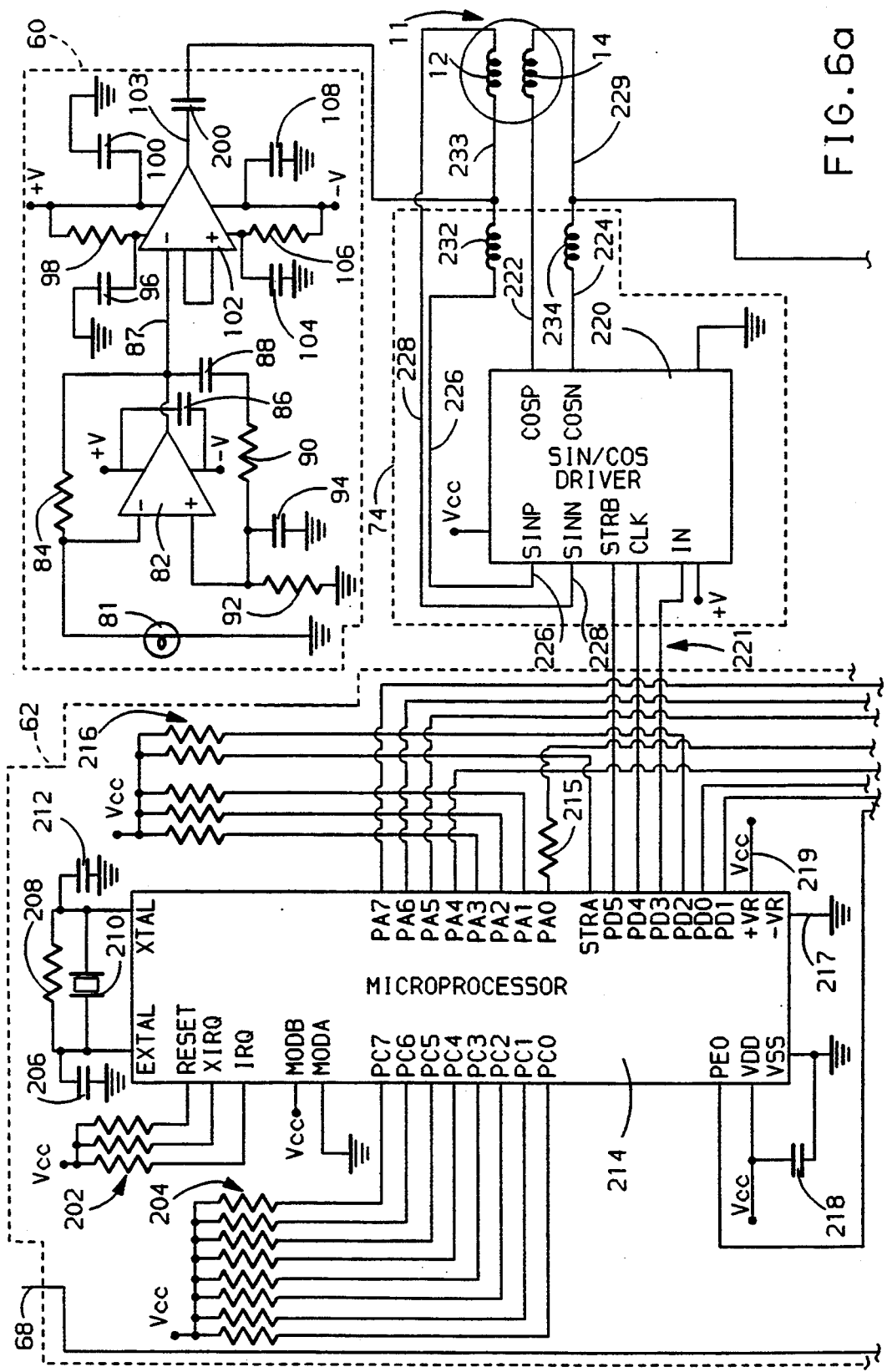
FIGS. 6a and 6b is a detailed illustration of the preferred implementation of the apparatus of this invention.
Figure 6B:
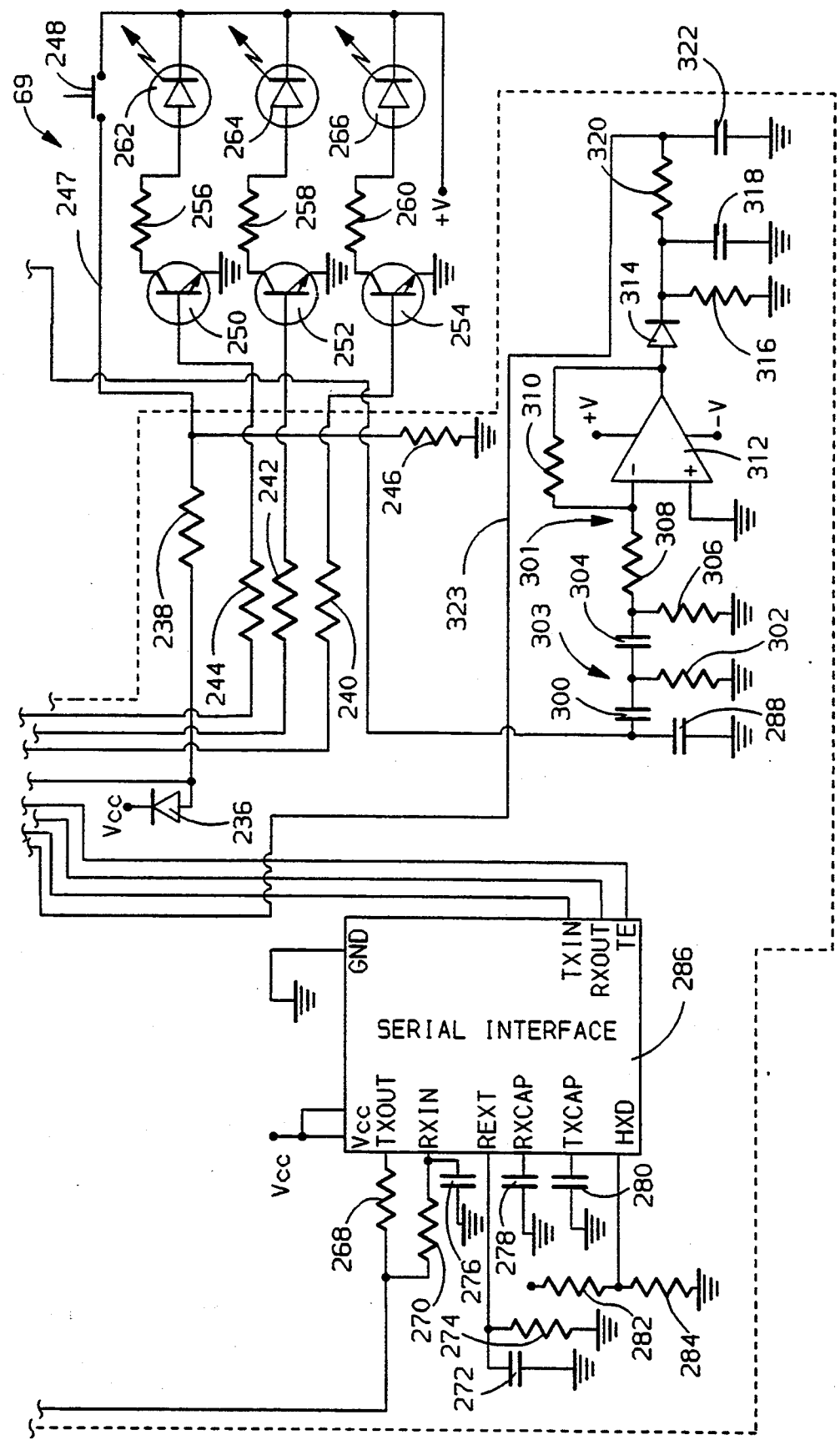

Referring to FIGS. 6a and 6b, the preferred implementation of this invention shown in detail includes a Wein bridge oscillator in the AC signal means 60. The Wein bridge oscillator includes operational amplifier 82 (LM318), lamp 81, resistors 84 (300 O), 90 (7.5 KO) and 92 (7.5 KO) and capacitors 86 (0.001 uF), 88 (0.001 uF) and 94 (0.01 uF). With the values shown, the Wein bridge oscillator generates a fairly noise free 15 Vpp 20 KHz sin wave on line 87.

Within the AC signal means 60, the sine wave on line 87 is coupled to a current amplifier comprising amplifier 102 (LH0063), resistors 98 (75 O) and 106 (75 O) and capacitors 96 (0.01 uF), 100 (0.01 uF), 104 (0.01 uF) and 108 (0.01 uF). The current amplifier has a unity gain and provides a signal on line 103 suitable for driving a 270 O gauge coil.

The signal on line 103 is capacitively coupled to coil 12 through capacitor 200 (3.3 uF). Capacitor 200 insulates the AC signal means from the DC components of the signal on line 233 provided by drive means 74.

Drive means 74 comprises sin/cosin driver 220. Sin/cosin driver 220 is controlled by microprocessor 214 through lines 221 and provides signals on lines 222 and 224 to drive coil 14 proportional to the cosin of the desired angle of rotation of gauge 11. Sin/cosin driver 220 provides signals on lines 226 and 228 to drive coil 12 proportional to the sin of the desired angle of rotation of gauge 11.

Inductor 232 (28 mH) insulates sin/cosin driver 220 from the AC input signal on line 233, while allowing the substantially DC sin drive signal on line 226 to be passed to coil 12. Line 228 is well grounded, with respect to the AC input signal, within sin/cosin driver 220 to provide a ground for the AC input signal across coil 12.

The AC output signal in coil 14 is sensed on line 229. Inductor 234 (200 mH) insulates sin/cosin driver 220 from the AC output signal on line 229. Line 222 is well grounded, with respect to the AC input signal, within sin/cosin driver 220 to prevent degradation of the AC output signal by sin/cosin driver 220 through that path.

The AC output signal on line 229 is sensed by sense circuit 301, part of the Signal receiving means. At the input of sense circuit 301 is capacitor 288 (1000 pF), which tunes the sense circuit to obtain maximum available amplitude from the AC output signal on line 29. The value of capacitor 288 will vary from implementation to implementation with the impedance of coil 14 (270 O), inductor 234, and the remainder of the circuit that affects line 29.

Also at the input of the sense circuit 301 is a two stage high pass filter 303. The first stage of high pass filter 303 comprises capacitor 300 (1000 pF) and resistor 302 (10 KO) and the second stage comprises capacitor 304 (560 pF) and resistor 306 (27 KO). High pass filter 303 filters out noise spikes from line 229 caused by inductors 232 and 234 during sudden changes in the gauge drive voltage in lines 224 and 226.

The portion of the sense circuit comprising resistors 308 (47 KO) and 310 (910 KO) and operational amplifier 312 (LM318) comprise an amplifier that amplifies the signal received from line 229 by a factor of about 20. The amplifier is calibrated so that the amplifier output is just under 5 volts when the coupled AC output signal on line 229 is at its maximum. This calibration achieves maximum resolution by the 5 volt A/D converter on microprocessor 214.

A peak detector is coupled to the output of operational amplifier 312 and comprises diode 314, resistor 316 (1 MO) and capacitor 318 (0.0056 uF). The peak detector circuit provides a magnitude signal indicative of the amplitude of the AC output signal, since microprocessor 214 performs its processes in response to the signal magnitude. Resistor 320 (4.7 KO) and capacitor 322 (0.01 uF) provide impedance matching for the A/D converter on microprocessor 214. The resulting magnitude signal on line 323 is coupled to an A/D input port on microprocessor 214.

Microprocessor 214 (Motorola® MC68HC11E2) executes a control program that sends control commands to sin/cosin driver 220 to control the gauge 11 and monitors the magnitude signal on line 323. Microprocessor 214 uses crystal 210 (8.0 MHz), resistor 208 (10 MO) and capacitors 206 (22 pF) and 212 (22 pF) for its clock. The unused input ports of microprocessor 214 are tied to the regulated supply voltage via resistors 202 (10 KO), 204 (10 KO) and 216 (10 KO). The positive and negative voltage references for the microprocessors A/D unit are tied to the regulated supply voltage and ground via lines 219 and 217, respectively. Capacitor 218 attenuates high frequency voltage transients that may appear on the supply line couple to the Vdd input of microprocessor 214.

Microprocessor 214 has one of its input ports and two output ports tied to serial interface 286. Serial interface 286 is connected as shown using resistors 268 (10 O), 270 (33.2 kO), 274 (36.9 KO), 282 (71.5 KO) and 284 (63.4 KO) and capacitors 276 (100 pF), 272 (100 pF), 278 (1000 pF) and 280 (1000 pF). Serial interface 286 allows for standard communication between microprocessor 214 and an external computer or microprocessor via line 68.

The implementation shown is designed so that the test sequence is initiated by an operator, so that a display 69 indicates the results of the test, and so that the results of the test may be communicated via serial interface 286. Switch 248 coupled to line 247 enables an operator to initiate the test routine. Normally, line 247 is held low via resistor 246 (10 KO). When switch 248 is depressed, line 247 is brought high and the high signal is coupled to an input port on microprocessor 214 via resistors 238 (4.7 KO) and 215 (10 KO). Diode 236 coupled to the regulated voltage supply ensures that the signal supplied by switch 248 is no greater than +5 volts.

Three of the output ports of microprocessor 214 are coupled via resistors 240 (4.7 KO), 242 (4.7 KO) and 244 (4.7 KO) to the bases of transistors 254, 252 and 250, respectively. Transistors 250, 252 and 254 are selectively activated by microprocessor 214 to light LEDs 262, 264 and 266 (preferably one LED is red, one is green and one is yellow), coupled via resistors 256 (220 O), 258 (220 O) and 260 (220 O), to indicate to an operator the status and results of the test on display 69.

Figure 7:
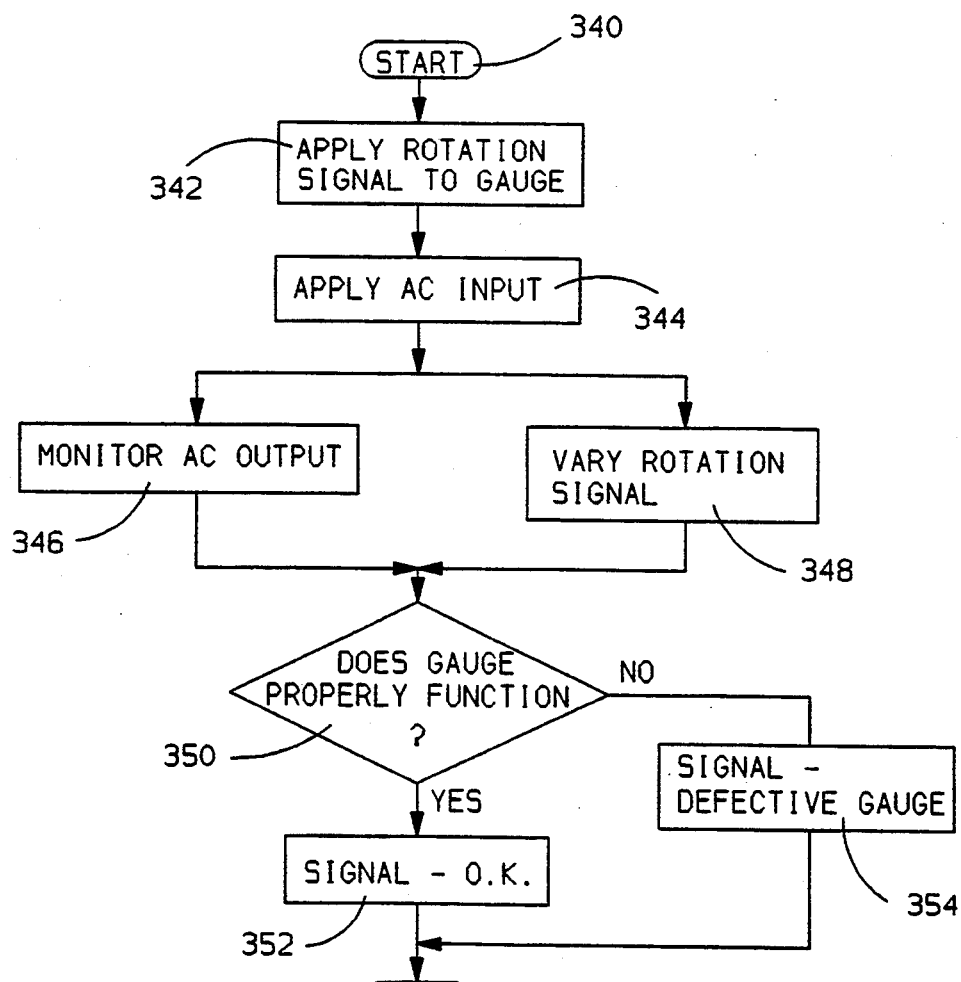
FIG. 7 is a flow diagram of the method of this invention.

Referring to FIG. 7, a general flow diagram for the method of this invention starts at step 340. At step 342, microprocessor 214 sends a command to sin/cosin driver 220, commanding gauge 11 to rotate to a specific position. Step 344 indicates that the AC input signal is applied to the first coil of gauge 11. During steps 346 and 348, microprocessor 214 commands sin/cosin driver 220 to rotate gauge 11 while monitoring the coupled AC output signal. At step 350, the microprocessor determines if gauge 11 functioned properly by comparing the monitored AC output signal to a set of parameters stored in computer memory. At steps 352 and 354, the computer outputs a signal indicating whether the gauge functioned properly.

The method shown in FIG. 7 is explained with reference to the implementation shown in FIGS. 6a and 6b. Any alternative implementation employing the steps 342-354, shown, is acceptable.

FIGS. 8, 9, 10a, 10b and 11 illustrate a flow routine of the program executed by microprocessor 214 in the preferred implementation of the invention. The program starts by initializing the microprocessor at step 360 and then moving to step 362, where it waits for a start signal from switch 248. The operator depresses switch 248 once the gauge 11 to be tested is connected into the test fixture.

When a start signal is received, the routine moves to block 364, where microprocessor 214 clears its registers (in case they are not cleared from a previous test). Microprocessor 214 also outputs a signal turning on the yellow LED, indicating that a test is in progress, and sends a command to sin/cosin driver 220 to rotate the rotor of gauge 11 to the zero degree position. At step 366, microprocessor 214 sends a set of commands to sin/cosin driver 220 to rotate the rotor through a 70 degree sweep in small increments. Sweeping the gauge instead of directly commanding the gauge to the 70 degree position minimizes the risk of the gauge becoming stuck in the 250 degree position (exactly opposite the 70 degree position). After the sweeping command, there is a 1 second delay to accommodate any damping in the gauge, which slows the rotation of the rotor.

At block 368, microprocessor 214 inputs the signal from line 323 indicative of the magnitude of the AC output signal. At block 372, microprocessor 214 compares the magnitude value to a preprogrammed range. The preprogrammed range is predetermined by sampling the magnitude value at the 70 degree position of several gauges known to be functioning properly and programming the acceptable high and low magnitude for the 70 degree position into microprocessor memory.

If at step 372, the magnitude value attained is not within the predetermined range, there is a probability that the rotor is improperly charged into a magnet, that the rotor is missing, or that the gauge windings are shorted or open. In such cases, the program moves to block 370 where the red LED is turned on to indicate that the gauge is rejected and an error message is output through serial line 68.

If at step 372 the magnitude is within the proper range, the program moves to step 374 where the damping of the gauge is tested. The damping test is shown in more detail in FIG. 9.

To begin the damping test, timers are initialized at block 390. At block 392, a zero degree position command is fed to the gauge directly. The gauge is not given sweeping commands. At this time, timers are activated. At block 394, the magnitude signal is monitored by microprocessor 214. At block 396, the computer determines if a peak or maximum (e.g., reference 22, FIG. 3) in the magnitude has occurred. At each sample of the magnitude signal, the slope of the magnitude signal is determined using the previous two data points. When the slope changes sign from positive to negative, a peak 22 is detected.

If no peak is detected, the routine moves to block 398, where the timer is checked. If the timer has not timed out to 600 ms, then the routine moves back to block 394 to take another sample of the magnitude signal. If the timer reaches 600 ms before a peak is detected, the routine moves to block 404, where a flag is set indicating that the gauge has failed the damping test. The damping test routine is then exited. If the gauge failed the test at block 398, it indicates that the rotor is either stuck or that the gauge is over-damped and too slow.

When the rotor passes through the 20 degree position, the magnitude value should be roughly equal to that obtained at the 70 degree position. If a magnitude value roughly equal to that at the 70 degree position is not obtained within a certain time period, then it is assumed that the gauge is either stuck or over damped. To accomplish this test, at block 402, the magnitude value is compared to that sampled at block 368, when the rotor was at the 70 degree position. If the two magnitude samples are not equal, then the routine moves to block 400, where the timer is checked to determine if 1.5 seconds has elapsed since the command at block 392 was given. If 1.5 seconds has not elapsed, then the routine moves back to block 394 to obtain another sample of the magnitude signal. If 1.5 seconds has elapsed, then it is assumed that either the gauge is stuck or it is over-damped, and the routine moves to block 410, where a flag is set indicating that the gauge has failed the test. The routine then exits the damping test.

If a magnitude signal roughly equal to the magnitude signal obtained at block 368 is attained, then the routine moves to block 406, where it checks the value of the timer against a minimum value. If the value of the timer is below the minimum value, it is an indication that the gauge does not have enough damping, and the routine moves to block 410. The minimum value of the timer varies for different gauges, since different gauge applications require different amounts of damping.

If the timer value was not too low at block 406, the routine moves to block 408, where the timer value is compared to a maximum to determine if the timer value is too high. If the timer value is too high, it indicates that the gauge is over-damped and the routine moves to block 410. Like the case with the minimum value, the maximum timer value will vary from implementation to implementation because different gauge applications require different amounts of damping.

Figure 8:
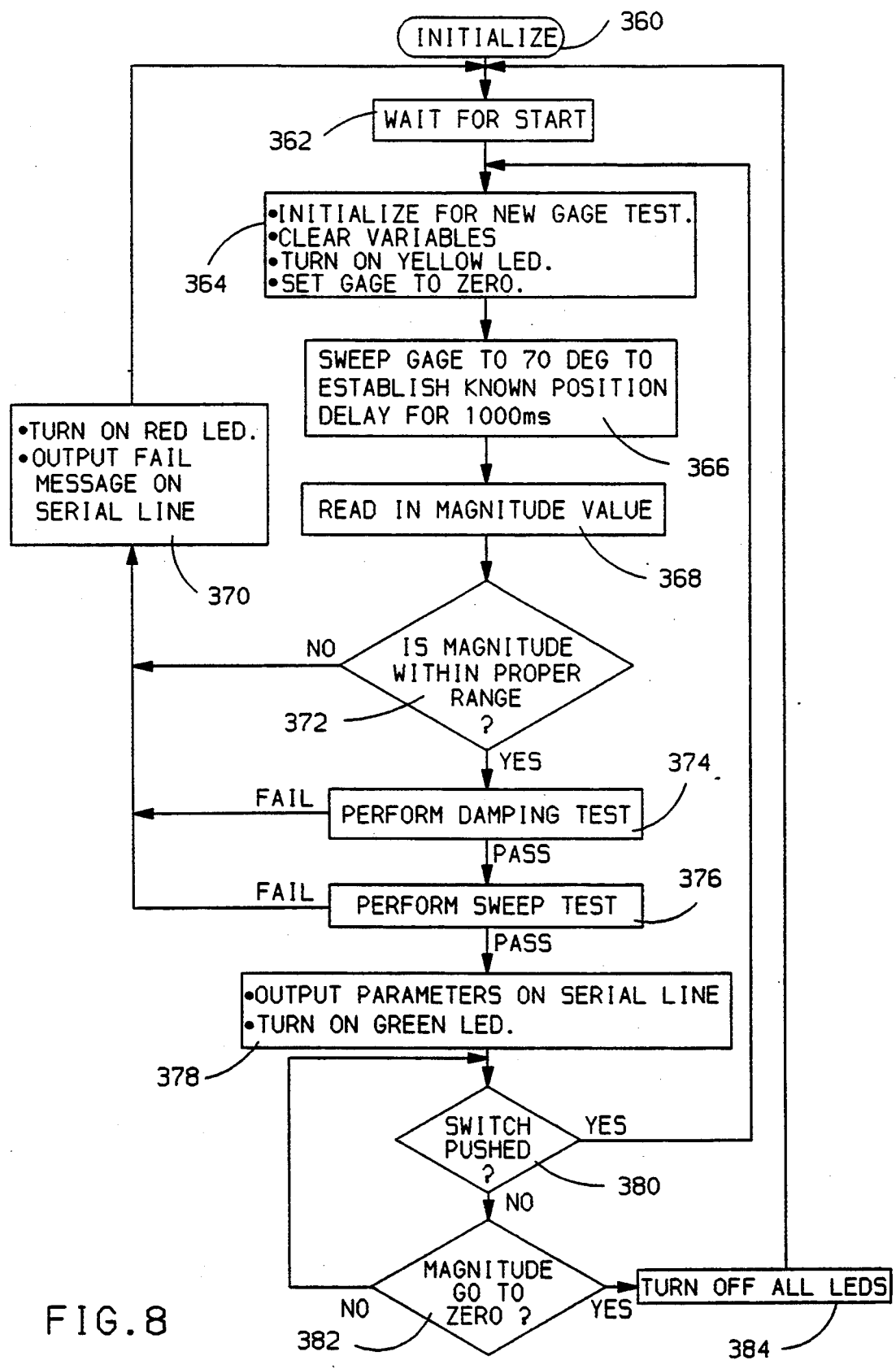
FIGS. 8, 9, 10a, 10b and 11 comprise a computer flow diagram of the preferred implementation of this invention.
Figure 9:
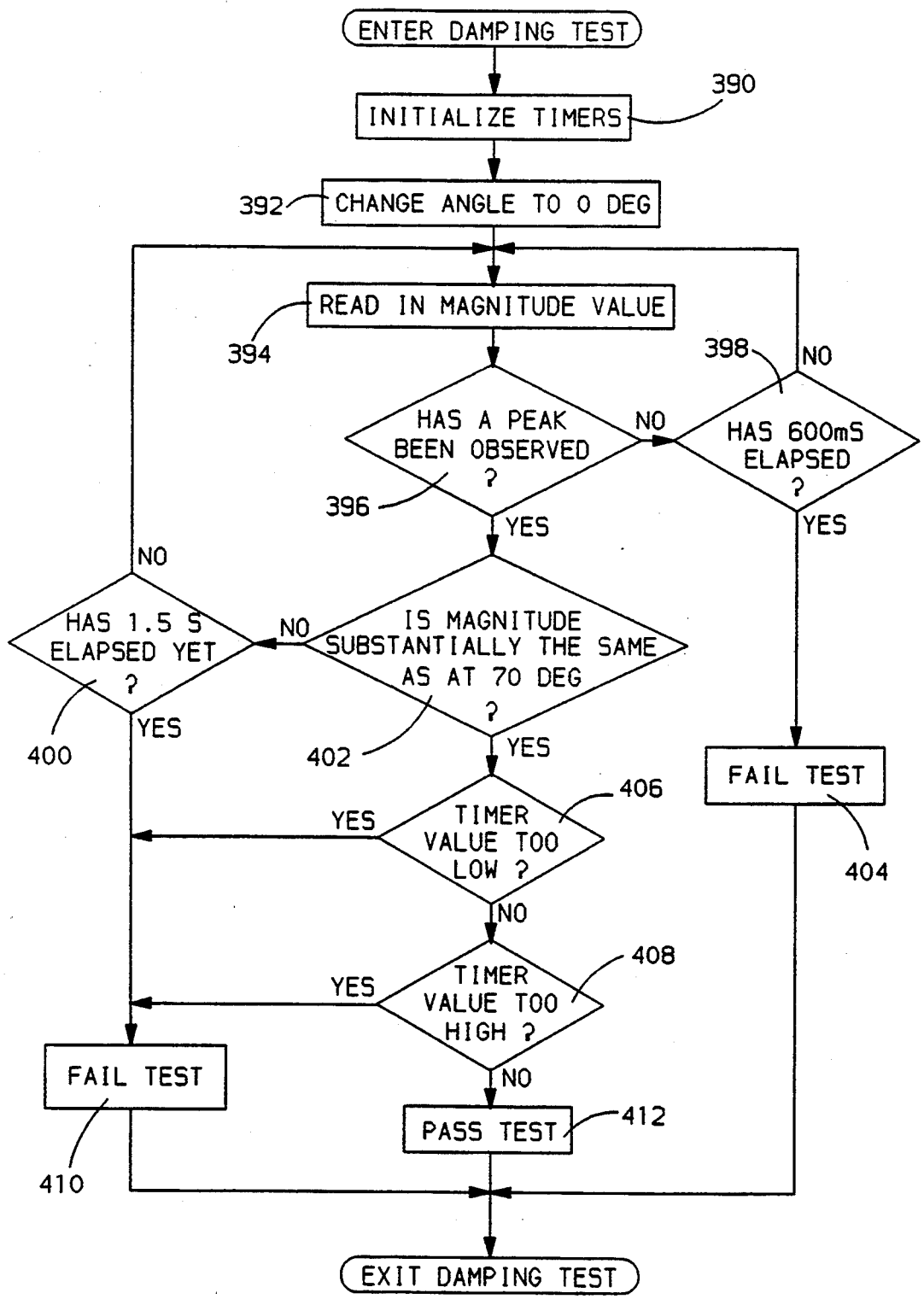

If the timer value is not too high at block 408, a flag is set at block 412 indicating that the gauge passed the damping test. The routine then exits the damping test. If the test was passed, the routine moves to block 376 (FIGS. 8 and 10). If the damping test was failed, the routine moves to block 370, to indicated to the operator that the gauge has failed.

Figure 10A:
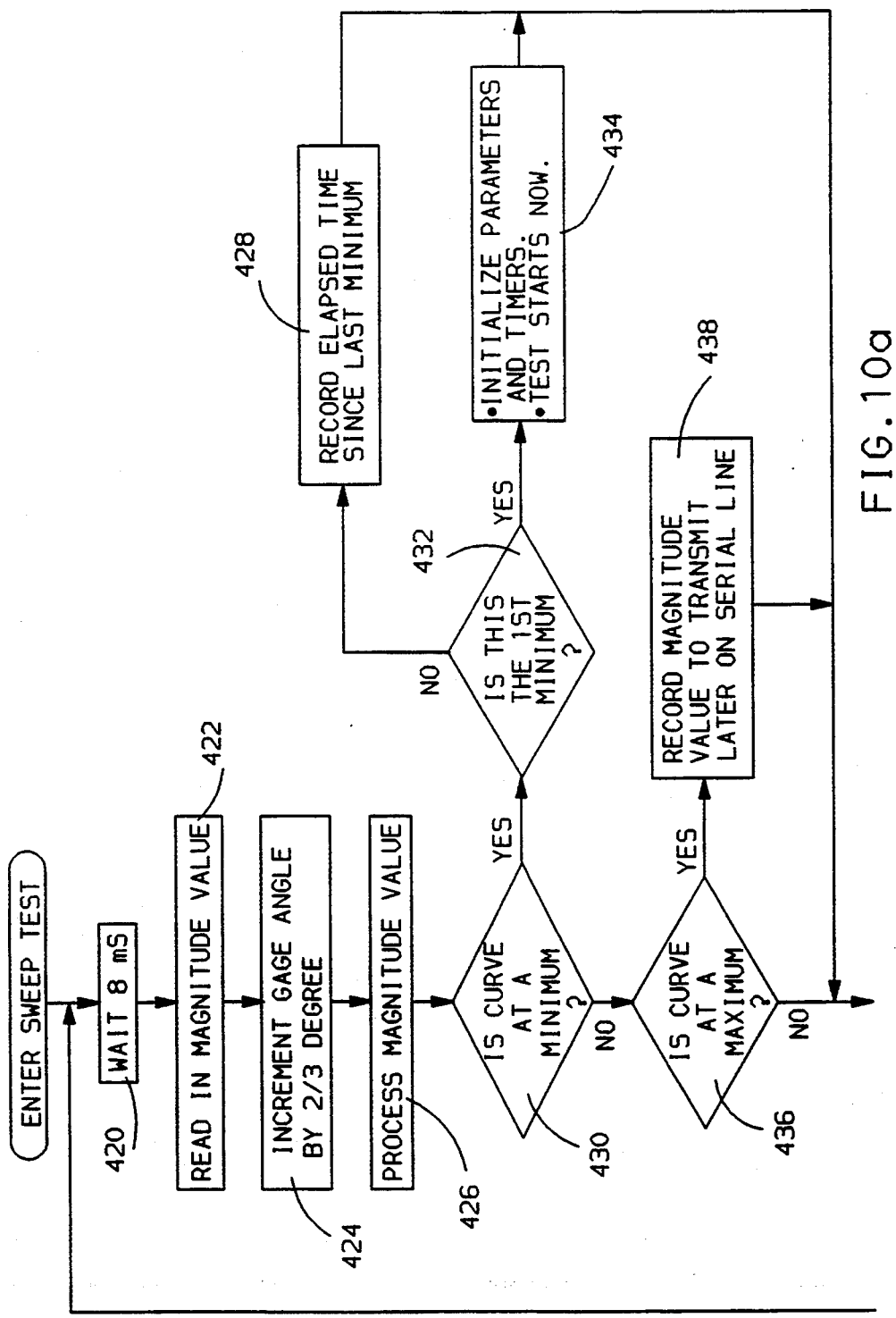
Figure 10B:
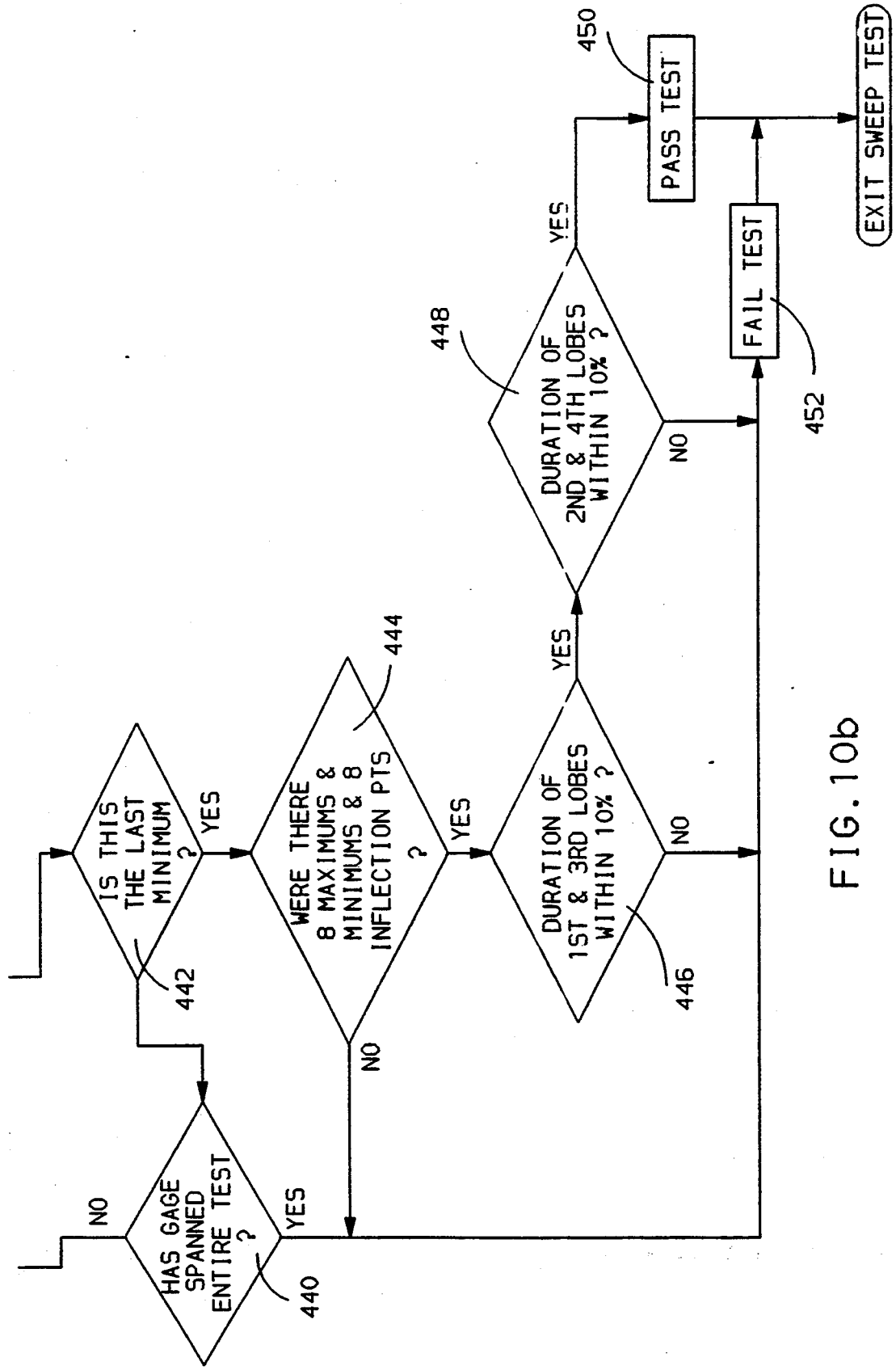
Figure 11:
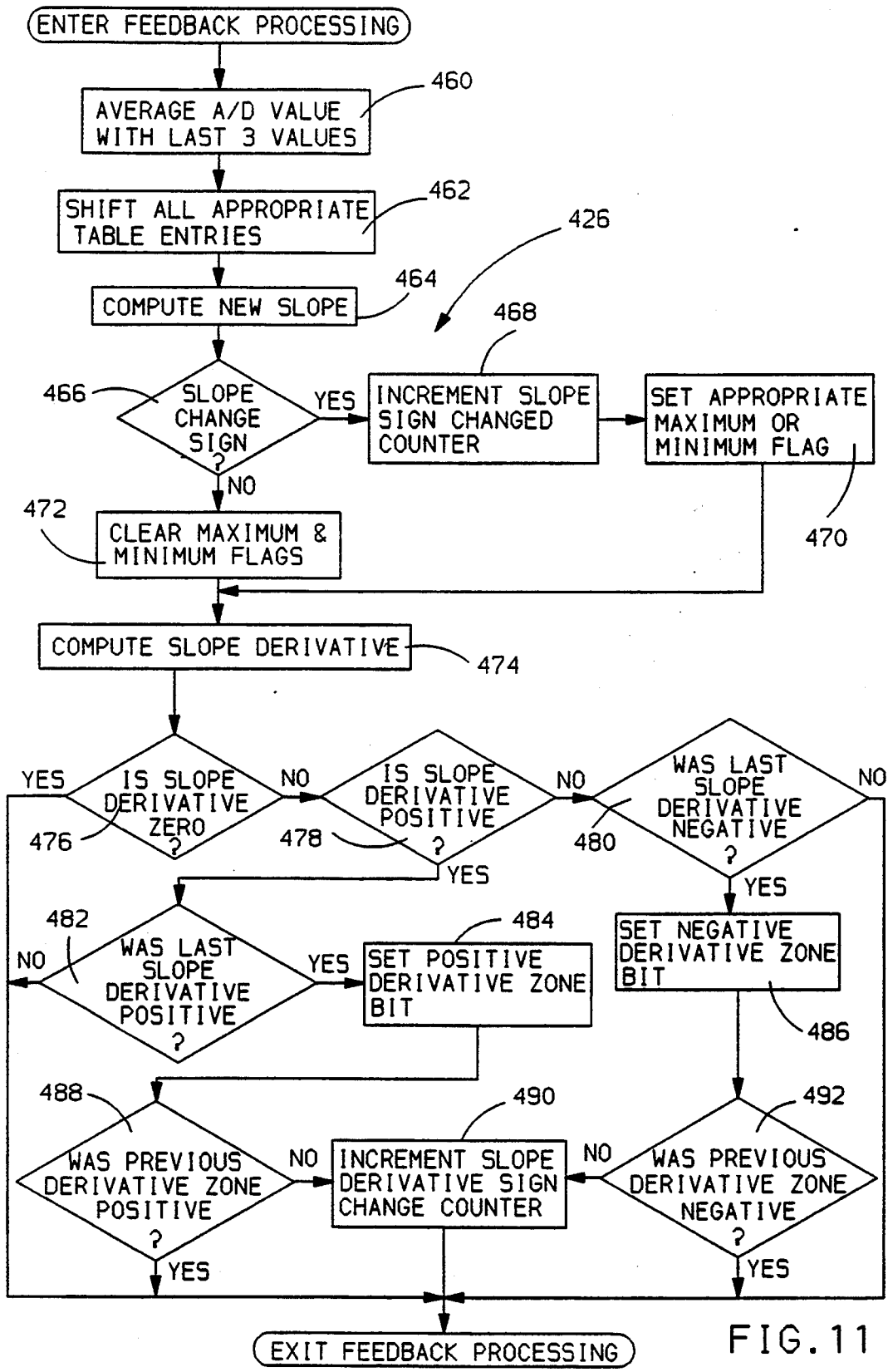

At block 376, a sweep test of the gauge is performed, and the flow diagram for the sweep test is shown in more detail in FIGS. 10 and 11. During the sweep test, the gauge is swept counter clockwise through about one and one half revolutions. The magnitude curve is monitored for the first minimum and the test is started at that point. At each new position (about every 8 ms), the slope of the magnitude curve and the derivative of the slope is computed (using the previous two data values). These two computations are monitored for a change in their sign, between positive and negative. A change in the sign of the slope indicates a minimum or a maximum point and a change in the sign of the derivative of the slope indicates an inflection point.

In one full revolution of the rotor, there should be four lobes (see references 34, 36, 38 and 40, FIG. 3) resulting in four minimums 28, four maximums 22 and 8 inflection points (one between each minimum and maximum). At the end of one revolution, if any more or less than four minimums, four maximums and eight inflection points occur, then the gauge is considered defective.

The inflection points are monitored to detect if the gauge has one or more positions where it tends to stick. The results of a sticky gauge will either show more than eight inflection points or lobes (34, 36, 38 and 40, FIG. 3) of different durations.

The routine begins execution of the feedback test at block 420, with an 8 ms pause. At block 422, the magnitude signal is sampled and at block 424 the gauge angle command is incremented by a small amount, i.e. ⅔ degree.

The routine then moves to block 426 where it processes the magnitude signal. The processing of the magnitude signal is shown in more detail in FIG. 11. At step block 460, the magnitude signal is averaged with the last three values to minimize the effect of noise. The table entries are shifted at block 462 to prepare for the computation of a new slope and new slope derivative.

At block 464, the slope of the magnitude signal is computed using the two most recent average signals, from block 460. Block 466 compares the present slope to the previous slope for a change in sign of the slope, indicating the occurrence of a minimum 28 or a maximum 22 (FIG. 3). If the sign of the slope changed, a counter indicating the number of slope sign changes is incremented at block 468. At block 470, a flag is set indicating whether the slope changed due to the occurrence of a minimum 28 (the slope changed from negative to positive) or a maximum 22 (the slope changed from positive to negative). If the slope did not change sign, then at block 472 the maximum and minimum flags are cleared.

The routine then continues to block 474 where the derivative of the slope of the magnitude curve is computed. At block 476, the routine tests the slope derivative to determine whether the slope derivative is zero. If the slope derivative is zero, then the routine exits the magnitude signal processing routine. If the slope derivative is not zero, then blocks 478–492 check for two consecutive slope derivatives of the same sign, to minimize error caused by the resolution of the microprocessor's A/D converter. If two consecutive slope derivatives of the same sign occur, their sign is compared to the sign of the last two slope derivatives of the same sign. If the sign of the new two slope derivatives is different from the sign of the last two slope derivatives to have the same sign, an inflection point has occurred, and the inflection point counter is incremented at block 490. The routine then exits the magnitude signal processing routine and then continues to block 430 (FIG. 10a).

At block 430, the minimum flag is checked. If the minimum flag is set, indicating that the magnitude curve is at a minimum the routine moves to block 432. At block 432, the routine checks whether only one minimum has occurred, if so, a timer is started at block 434. If more than one minimum has occurred, then, at block 428, the time since the last minimum is recorded.

If, at block 430, the routine determines that the minimum flag was not set, the routine moves to block 436 where it determines if a maximum flag is set. If the maximum flag is set, then the routine moves to block 438 where it records the maximum magnitude signal.

The routine then continues to block 442, where the minimum count is checked to determine if four minimums have been counted. If not, the routine moves to block 440, where it loops back to block 420 if the test is not complete, or continues to block 452 where a flag is set indicating that the gauge has failed the test.

At block 442, if four minimums have been counted, the routine continues to block 444, where it determines if a total of eight maximum and minimums occurred and if eight inflection points occurred. If not the gauge is considered erroneous and the routine continues to block 452. If eight maximum and minimums occurred and eight inflection points occurred, the routine moves to block 446.

Blocks 446 and 448 determine if the durations of the first and third lobes are within 10 percent of each other and if the durations of the second and fourth lobes are within 10 percent of each other. If so, the routine moves to block 450, where a flag is set indicating the gauge passed the sweep test. If the durations of the first and third lobes are not within 10 percent of each other or the durations of the second and fourth lobes are not within 10 percent of each other, then the routine moves to block 452 and sets a flag indicating that the gauge failed the test.

Referring again to FIG. 8, if the gauge being tested failed the sweep test, the routine moves to block 370 to indicate that the gauge failed the test. If the gauge being tested passed the test, the routine moves to block 378, where the microprocessor turns on the green LED, indicating to the operator that the gauge functions properly, and outputs the gauge parameters, such as the maximum magnitude signal, through the serial communications line 68.

The routine then moves to block 380 to run the test again if the switch 248 is depressed. At block 382, if no magnitude signal is detected, indicating that the gauge has been removed from the test fixture, all of the LEDs are turned off at block 384 and the routine returns to block 362, where it waits to start again.

In the above routine, the parameters against which the gauges are tested will very among types of gauges, with coil impedance and the type of magnetic rotor used. The amount of damping required of a gauge will vary for different implementations, and the damping test parameters will correspondingly vary.

Although the above apparatus and method showed this invention in use with sin/cosin driver 220, any known analog gauge driving scheme may be used, including pulse width modulation. If a pulse width modulation scheme is used to drive the gauge, improved filters, such as narrow band-pass filters, will be necessary to separate the pulse width signal from the AC output signal.

The values for circuit components shown above are just example values and may vary from implementation to implementation. The apparatus of the invention described above includes a two pole magnetic rotor. Magnetic rotors of more than two poles may be used but are not preferred.

The above described examples of this invention use an operator to initiate and monitor the gauge testing. Alternatively, the apparatus and method of this invention may easily be fully automated with computerized initiation and monitoring of the testing and automated rejection of gauges that fail the testing. Such implementations also fall within the scope of this invention.

For example, in an automated test fixture, an operator may place an air core gauge into the fixture and then close a pivotable bar to hold the gauge in place. The pivotable bar, when closed, activates a switch that signals a programmable controller to start automatic testing of the gauge. Push button 248 (FIG. 6b) is replaced by a buffer resistor coupled between a signal output of the programmable controller and line 247 to commence the test routine implemented by microprocessor 214. The test output signals, instead of illuminating LEDs 262, 264 and 266, may be coupled to signal inputs of the programmable controller, which programmable controller may responsively control a fixture to automatically reject the gauge or illuminate proper lights on an indicator panel, signaling the operator to replace the gauge.

The above described examples of this invention process the magnitude of the AC output signal. Because the AC output signal is a vector, having both magnitude and phase variations, phase discrimination circuitry used to process the AC output signal may also be implemented, with such implementations falling within the scope of this invention.

The above apparatus and method of this invention are example implementations. Various other improvements and modifications to this invention may occur to those skilled in the art, as the possibilities are endless, and such improvements and modifications will fall within the scope of this invention as set forth below.

The embodiments of the invention in which an exclusive property or privilege is claimed are defined as follows:

1. An apparatus for testing gauges comprising:
   controllable drive means for applying a variable rotation signal to at least first and second coils of a gauge;
   means for applying an input AC signal to the first coil of the gauge, superimposing the input AC signal over the rotation signal in the first coil; and
   process means for (i) receiving a coupled AC output signal from the second coil, (ii) controlling the drive means to affect a variation in the rotation signal, and (iii) providing a process output signal, responsive to the AC output signal, indicative of the operational status of the gauge.

2. The apparatus of claim 1, also comprising a display, responsive to the process output signal, indicating the operational status of the gauge.

3. The apparatus of claim 1 wherein the controllable drive means comprises a sin/cosin gauge driver.

4. The apparatus of claim 1 wherein the process means comprises a microprocessor.

5. The apparatus of claim 1, wherein the process means:
   controls the drive means to rotate the gauge through a predetermined rotation; and
   monitors the AC output signal to firstly determine whether the gauge, responsive to the drive means, completes the predetermined rotation; and
   provides the process output signal responsive to the first determination.

6. The apparatus of claim 5, wherein the process means also monitors the AC output signal to secondly determine whether the gauge completes the predetermined rotation within a predetermined time period and provides the process output signal also responsive to the second determination.

7. The apparatus of claim 1, wherein the process means:
   controls the drive means to rotate the gauge through at least one complete rotation;
   monitors the AC output signal to firstly determine whether the gauge, responsive to the drive means, completes the rotation;
   secondly determines the slope of the magnitude of the AC output signal; and
   provides the process output signal responsive to the secondly determined slope.

8. The apparatus of claim 7, wherein the process means:
   thirdly determines, responsive to the determined slope, durations of first, second, third and fourth lobes in the magnitude of the AC output signal;
   fourthly determines if the durations of the first and third lobes are substantially equal;
   fifthly determines if the durations of the second and fourth lobes are substantially equal; and
   provides the process output signal responsive to the fourth and fifth determinations.

9. The apparatus of claim 7, wherein the process means:
   thirdly determines a derivative of the determined slope; and
   provides the process output signal responsive to the determined derivative.

10. A method of testing gauges comprising the steps of:
    applying a rotation signal to the gauge;
    applying an AC input signal to a first coil of the gauge;
    monitoring a second coil of the gauge to detect a coupled AC output signal;
    varying the rotation signal applied to the gauge;
    determining the operational status of the gauge responsive to the AC output signal; and
    providing a process output signal indicative of the operational status of the gauge.

11. The method of claim 10, also comprising the step of:
    lighting a display in response to the process output signal.

* * * * *